(12) United States Patent
Lee

(10) Patent No.: US 10,713,170 B2
(45) Date of Patent: Jul. 14, 2020

(54) MULTIPLE CHANNEL CACHE MEMORY AND SYSTEM MEMORY DEVICE UTILIZING A PSEUDO-MULTIPLE PORT FOR COMMANDS AND ADDRESSES AND A MULTIPLE FREQUENCY BAND QAM SERIALIZER/DESERIALIZER FOR DATA

(71) Applicant: TSVLink Corp, a Delaware corporation, Los Altos Hills, CA (US)

(72) Inventor: Sheau-Jiung Lee, Saratoga, CA (US)

(73) Assignee: TSVLINK CORP., Santa Clara, CA (US)

( * ) Notice: Subject to any disclaimer, the term of this patent is extended or adjusted under 35 U.S.C. 154(b) by 0 days.

(21) Appl. No.: 15/657,972

(22) Filed: Jul. 24, 2017

(65) Prior Publication Data

US 2018/0032436 A1 Feb. 1, 2018

Related U.S. Application Data

(60) Provisional application No. 62/369,597, filed on Aug. 1, 2016.

(51) Int. Cl.
*G06F 12/0842* (2016.01)
*G06F 13/38* (2006.01)
*G06F 13/00* (2006.01)

(52) U.S. Cl.
CPC .......... *G06F 12/0842* (2013.01); *G06F 13/00* (2013.01); *G06F 13/385* (2013.01); *G06F 2212/1016* (2013.01); *G06F 2212/62* (2013.01)

(58) Field of Classification Search
CPC .................................................. G06F 12/0842
USPC ......................................................... 711/130
See application file for complete search history.

(56) References Cited

U.S. PATENT DOCUMENTS

| | | |
|---|---|---|
| 5,206,833 A | 4/1993 | Lee |
| 2009/0307406 A1 | 12/2009 | Aleksic et al. |
| 2013/0054896 A1* | 2/2013 | Colavin ................ G06F 12/084 711/118 |
| 2013/0103912 A1 | 4/2013 | Jones et al. |
| 2014/0040556 A1* | 2/2014 | Walker .................. G06F 9/5016 711/130 |
| 2014/0215245 A1 | 7/2014 | Zhang et al. |
| 2015/0312070 A1* | 10/2015 | Lee ......................... H03M 9/00 375/257 |
| 2018/0234846 A1* | 8/2018 | Tao ........................ H04W 12/06 |

FOREIGN PATENT DOCUMENTS

| | | |
|---|---|---|
| JP | 2004 334868 A | 11/2004 |
| JP | 2005 316546 A | 11/2005 |
| JP | 2006 236388 A | 9/2006 |
| JP | 2009 521767 A | 6/2009 |
| JP | 2015 172960 A | 10/2015 |

* cited by examiner

*Primary Examiner* — Gautam Sain
(74) *Attorney, Agent, or Firm* — DLA Piper LLP (US)

(57) ABSTRACT

A high performance, low power, and cost effective multiple channel cache-system memory system is disclosed.

16 Claims, 6 Drawing Sheets

MULTIPLE CHANNEL CACHE MEMORY AND SYSTEM MEMORY DEVICE UTILIZING A PSEUDO-MULTIPLE PORT FOR COMMANDS AND ADDRESSES AND A MULTIPLE FREQUENCY BAND QAM SERIALIZER/DESERIALIZER FOR DATA

PRIORITY CLAIM

This application claims priority to U.S. Provisional Application No. 62/369,597, filed on Aug. 1, 2016, and titled "Multiple Channel Cache Memory and System Memory Device Utilizing a Pseudo Multiple Port for Commands and Addresses and A Multiple Frequency Band QAM Serializer/ De-Serializer for Data," which is incorporated herein by reference.

TECHNICAL FIELD

A high performance, low power and cost effective multiple channel cache memory/system memory is disclosed.

BACKGROUND OF THE INVENTION

The performance of both cache memory and system memory is critical in high performance computing systems containing multiple cores processors or multiple processors, particularly systems using additional hardware accelerators such as graphics processing units (GPUs). These computing systems increasingly not only perform general purpose computing but also perform deep machine learning and large data mining.

To handle the demands placed on the computing system, the memory systems need to be optimized for memory access latency and memory bandwidth at the same time. In order to optimize memory access latency and memory bandwidth on the same computing system, one must increase cache performance as well as reduce the frequency of memory collisions on the buses.

Prior art approaches have included increasing cache performance by integrating a large cache RAM on the same silicon as the processor cores it is servicing. However, this approach is limited due to the cost of large size RAM.

Other prior art approaches have used large off-chip RAM located on different silicon than the processor cores it is serving. However, this approach requires a large number of connection pins between the RAM chip and the processor core chip, and the system design cost become unfavorable.

Another prior art approach is a "brute force" approach that increases memory bandwidth by increasing the bus width and clock rate of the memory bus. However, under this approach, memory requests from different memory masters of the system can easily collide when the system has multiple hardware accelerators.

Another prior art approach is a multiple concurrent memory channel, which is the most effective solution to maintain a high effective memory bandwidth and support the high bandwidth to multiple hardware accelerators. The limitation of this approach is that once again you need a large number of interface connection pins between the processor chip and the RAM chip. Using a large number of connection pins increases the cost, size, and manufacturing complexity of the chips.

The prior art also includes multiple approaches for transmitting data from one chip to another chip. In U.S. Pat. No. 9,369,318, titled "Scalable Serial/De-serial I/O for Chip-to-Chip Connection Based on Multi Frequency QAM Scheme," which is incorporated by reference herein and which shares an inventor with this application, an embodiment of a serializer/deserializer ("SerDes") was disclosed.

This prior art technique is shown in FIG. 5. Serializer 530 and deserializer 540 typically are located on different chips and are connected by I/O interface 510. Serializer 540 receives parallel digital data, in this example shown as eight bits, D0 to D7. The data is converted into analog form by digital-to-analog 2-bit converters 501, 502, 503, and 504. Each analog output from the digital-to-analog 2-bit converters 501, 502, 503, and 504 is coupled to QAM mixers. Output from DAC 501 is received at the QAM I channel at mixer 505, which also receives a 90 degree out-of-phase modulation carrier F1_I. Output from DAC 502 is received at the QAM I channel at mixer 506, which also receives a 90 degree out-of-phase modulation carrier F1_Q. Mixers 505 and 506 are both associated with QAM modulator 524. Similarly, output from DAC 503 is coupled to mixer 507 which also receives 90 degree out-of-phase modulation carrier F2_I, while output from DAC 504 is received at mixer 508 which also receives 90 degree out-of-phase modulation carrier F2_Q. Mixers 507 and 508 are both associated with QAM modulator 525. Outputs from the mixers of both QAM modulators 524 and 525 are summed at adder 509 and output over I/O interface 510 from the chip containing serializer 530. Through this modulation process, the parallel input is thus serialized into a series output as an analog signal.

The analog signal over I/O connection 510 is received by deserializer 540 in a second chip. Deserializer 540 preferable includes amplifier 511 which receives the signal and provides a gain stage to compensate for loss in the low pass filter. The amplified signal is provided to mixers 512 and 513 in a first QAM demodulator 526, which receives 90 degree out-of-phase modulation carriers F1_I, F1_Q, respectively, and to mixers 514 and 515 in a second QAM demodulator 527, which receives the amplified signal as well as 90 degree out-of-phase modulation carriers F2_I, F2_Q. Four analog signal channels are output from mixers 512, 513, 514, and 515 to low pass filters 516, 517, 518, and 519, respectively. The low pass filters may be of any desired configuration and order (i.e., 2nd order, 3rd order and so forth). Output from low pass filters 516, 517, 518, and 519 is received by two-bit analog-to-digital converters (ADC) 520, 521, 522, and 523, respectively, which output the digital data. Through this demodulation process, the analog serial input is thus deserialized back to a parallel digital output. Typically, each chip will contain serializer 530 and deserializer 540, such that either chip can send data and either chip can receive data.

Thus, in the prior art system of FIG. 5, an 8 bit parallel input is serialized by two frequency bands of QAM16 to one I/O interface in a first chip, sent to a second chip, and then deserialized in the second chip by two frequency bands of QAM16 demodulation back into the original parallel data. It should be appreciated that other configurations can be used, such as using 16 bits of parallel data and four frequency bands of QAM16 or two frequency bands of QAM256. To date, the SerDes design of FIG. 5 has not been used in a memory system.

The prior art includes other techniques for maximizing the amount of information that can be transmitted over a given channel. U.S. Pat. No. 5,206,833, titled "Pipelined Dual Port RAM," which is incorporated by reference herein and which shares an inventor with this application, introduced a technique of a pseudo multiple port memory. This prior art technique is shown in FIG. 6. Devices 601 and 602 each output data, which is received by multiplexor 603. Multiplexor 603 is controlled by an arbitration signal. Multiplexor 603 combines the data from devices 601 and 602 into a single channel, as shown. In one embodiment, device 601 is given priority over device 602, and the data from device 602 is output from multiplexor 603 only when device 601 is in a lull. This effectively creates a pseudo-multiple port device even though in reality only one port exists. To date, this technique has not been used in handling command and address data in a memory system.

What is needed is a new architecture for cache memory and system memory that allows multiple memory channels that can operate concurrently while also optimizing memory access latency and memory bandwidth without adding a large number of additional pins between a processor chip and a memory chip.

SUMMARY OF THE INVENTION

The embodiments described herein comprise a cache memory and system memory architecture that utilizes the SerDes technique for the data bus and the pseudo-multiple port technique for the command/address bus, resulting in multiple channel, concurrent cache-system memory. The proposed multiple channels of cache-system memory results in good cache performance as well as good system memory performance.

DETAILED DESCRIPTION OF THE PREFERRED EMBODIMENTS

Figure 1:
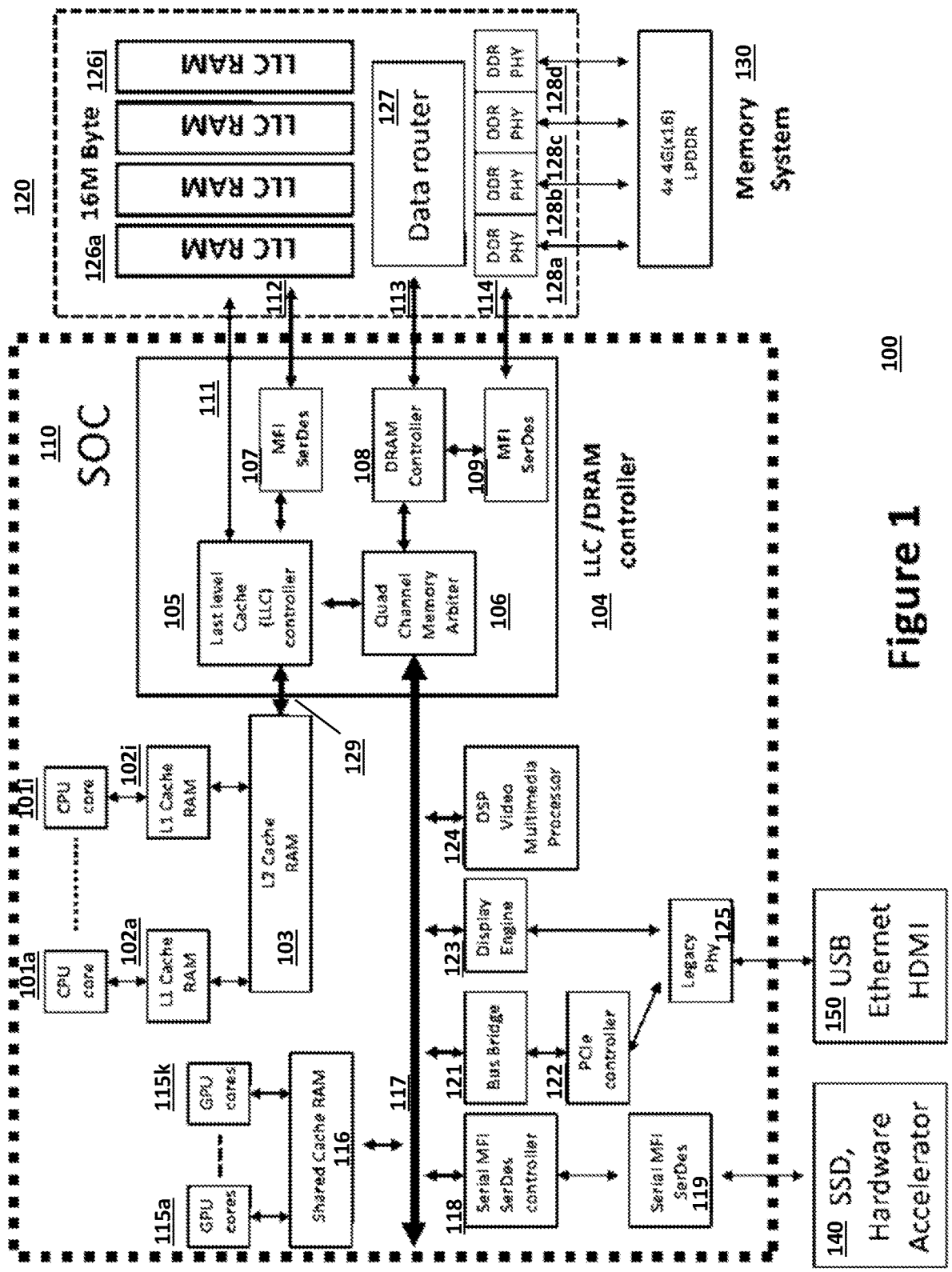
FIG. 1 depicts an embodiment of a computing device utilizing an improved cache memory and system memory architecture.

FIG. 1 depicts an embodiment of computing device 100 comprising a 4-channel concurrent cache-system memory system. Computing device 100 comprises system-on-chip processor (labeled as "SOC") 110, which contains last level cache and system memory controller (labeled as "LLC/DRAM controller") 104. SOC processor 110 is coupled to cache system chip 120, which is separate from SOC processor 110.

Cache system chip 120 integrates multiple channels of cache RAM and legacy PHY to connect different type of system memory. Cache system chip 120 comprises data router 127 that regulates the traffic between cache system chip 120, system memory bus 117, and processor cache bus 129. Cache system chip 120 further comprises cache memory arrays 126a ... 126j (where j is an integer, such as 4) and legacy physical interfaces (PHY) 128a ... 128d (where d is an integer, such as 4) to connect cache system chip 120 to system memory 130 such as LPDDR, DDR, GDR, HBM, HMC etc. In this example, cache memory arrays 126 comprise four arrays of 4 MB each. One of ordinary skill in the art will understand that the example of FIG. 1 can be expanded to include additional memory channels and larger cache RAM size depending the target performance and complexity of the system-on-chip.

SOC processor 110 further comprises CPU cores 101a ... 101i (where i is an integer, such as 2 or 4), each of which is coupled to an L1 cache memory system 102a ... 102i, each of which in turn is coupled to L2 cache memory system 103. L2 cache memory system 103 is coupled to LLC/DRAM controller 104 (specifically, to last level cache controller 105) over processor cache bus 129. Here, LLC or last-level cache refers to the last level of cache memory utilized by CPU cores 101a ... 101i, such as L3 or L4 (the latter of which would require another level of cache memory between L2 cache memory 103 and last level cache controller 105).

SOC processor 110 further comprises graphics processor unit (GPU) cores 115a ... 115k (where k is an integer), each of which is coupled to shared GPU cache memory system 116.

SOC processor 110 further comprises system bus 117, to which the following devices are coupled: shared GPU cache memory system 116, Serial MFI SerDes controller 118, bus bridge 121, display engine 123, DSP video multimedia processor 124, and SOC processor 110. Serial MFI SerDes controller 118 is also coupled to Serial MFI SerDes 119, which in turn connects to external devices 140 such as a solid state drive or hardware accelerator. Bus bridge 121 is coupled to PCIe (PCI Express) controller 122, which in turn is coupled to Legacy Phy 125. Display engine 123 also is coupled to Legal Phy 125, which in turn connects to I/O ports 150, such as USB, Ethernet, and HDMI ports.

LLC/DRAM controller 104 further comprises last level cache (LLC) controller 105, quad channel memory arbiter 106, MFI SerDes 107, DRAM controller 108, and MFI SerDes 109. Quad channel memory arbiter 106 is coupled to system bus 117.

As shown in FIG. 1, it is likely that a system will have multiple hardware accelerators and memory masters. A multiple memory channel can reduce the probability of memory requests colliding and can achieve a high sustained memory bandwidth. If two memory requests do collide at a particular memory channel, then memory arbiter 106 performs request arbitration to grant the service to a specific memory master based on the arbitration algorithm.

Figure 2:
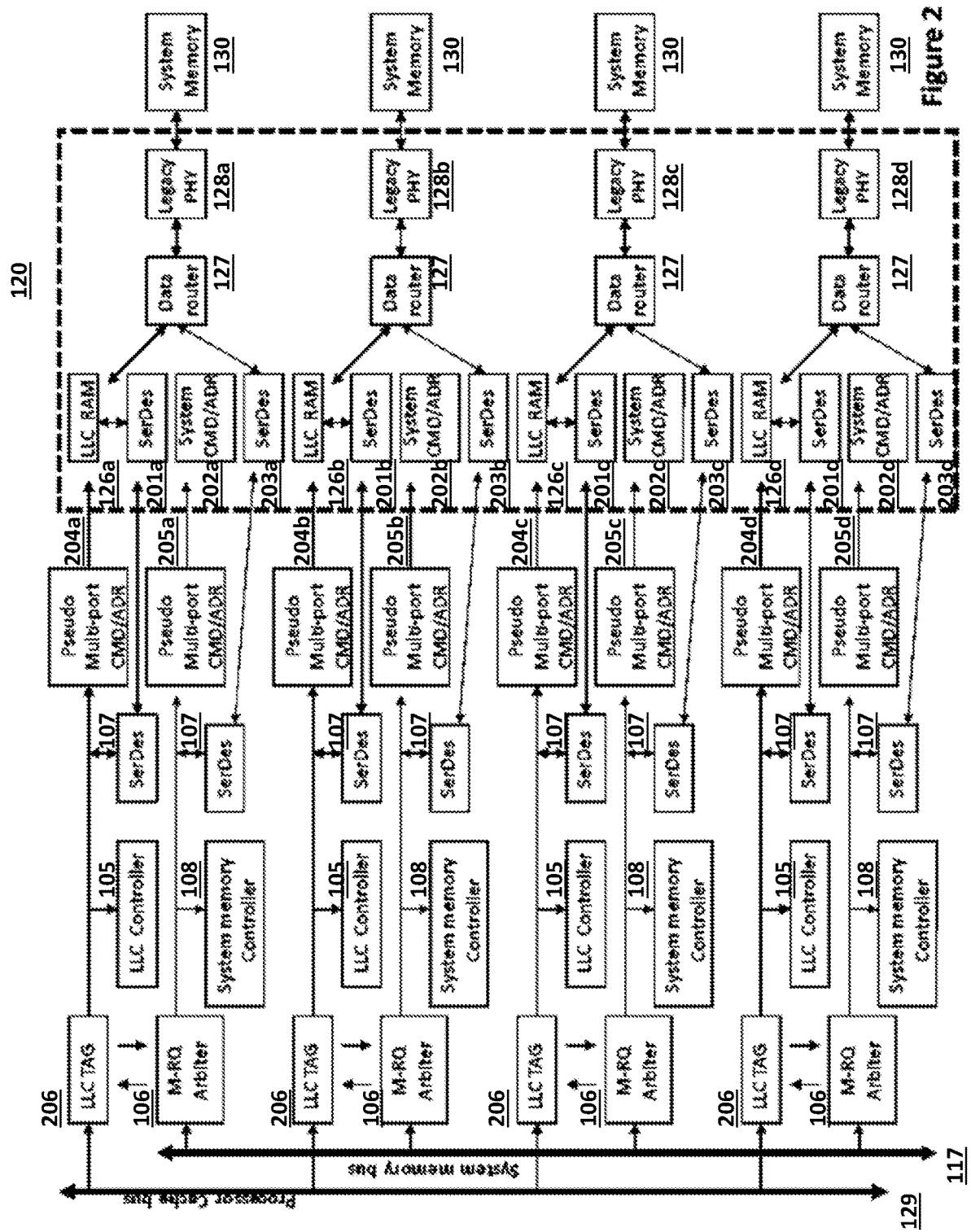
FIG. 2 contains a block diagram of a quad channel of an embodiment utilizing the improved cache memory and system memory architecture.

FIG. 2 contains additional details regarding the quad-channel concurrent cache memory/system memory system of computing device 100. Processor cache bus 129 and system bus 117 are depicted. System memory bus 117 is connected to quad channel memory arbiter 106, which in turn is coupled to system memory controller 108, SerDes 107, and pseudo multi-port CMD/ADR 205a, 205b, 205c, and 205d. Processor cache bus 129 is coupled to LLC Tag 206, which in turn is coupled to LLC controller 105, SerDes 107, and pseudo multi-port CMD/ADR 204a, 204b, 204c, and 204d.... Pseudo multi-port CMD/ADR 204, 204b, 204c, 204d, 205a, 205b, 205c, and 205d are coupled to cache system chip 120, specifically, to system CMD/ADR interface 202a, 202b, 202c, and 202d. SerDes 107 is coupled to cache system chip 120, specifically, to SerDes interface 201a, 201b, 20c, 201d, 203a, 203b, 203c, and 203d. Data router 127 is coupled to Legacy Phy 128a, 128b, 128c, and 128d, which in turn are coupled to system memory 130.

In FIG. 2, the memory requests are asserted not only by memory masters on system memory bus 117 but also by last level cache 105 when there is a cache miss. That is, for a particular memory request, LLC controller 105 will first check the last level cache memory for the data. If the data is not present in the last level cache memory or if the data is stale, that will be considered a cache miss, and the request will be forwarded to cache system chip 120. The data path for memory access will be arranged by data router 127 in cache memory chip 120 for various bus conditions. Once arbiter 106 decides which memory master to serve, the bus request is forwarded to the system memory controller 108. The state machine inside system memory controller 108 will issue the correct sequence of command and address to system memory 130.

When arbiter 106 forwards a request to system memory controller 108, it also needs to forward the same memory request to the last level cache (LLC) TAG 206, for snooping comparison if the memory request is on cacheable exchange memory region. If there is a snooping hit, data router 127 in the cache memory chip 120 must perform the data path re-route from the fast cache RAM 126a . . . 126j instead of the relatively slow system memory 130.

The SOC processor 110 accesses memory concurrently to other system memory masters when the processor memory request is a cache hit. But when there is a cache miss, the LLC TAG 206 must forward the processor memory request to the arbiter 106, and the arbiter 106 grants system memory bus 117 to LLC TAG 206. Once this cache miss cycle is executed, the data router 127 in the cache memory chip 120 must perform data path re-outing.

Table 1 shows how data router 127 within the cache memory chip 120 performs routing for all possible cycles:

In this embodiment, data router 127 in cache memory chip 120 must perform the memory data path routing described in the Table 1.

Utilizing the SerDes architecture can reduce the number of pins required for the data bus between the SOC processor 110 and cache memory chip 120 as shown in FIG. 2. But the SerDes design cannot be used for the command and address bus because the latency of a half-duplex SerDes degrades the memory performance. A full duplex SerDes can solve the latency problem but the cost of doubling the pin number simply defeats the advantage of SerDes as compared to a parallel bus.

When the system memory bus 117 transfers the data in the fixed burst length transfer, one can observe the idle cycles between consecutive commands and addresses on the bus. In a typical memory design, the burst length is a fixed burst of 4 or 8 for each memory access. The choice of burst length for memory bus is to synchronize the processor cache line size and DRAM fixed burst length.

Figure 3:
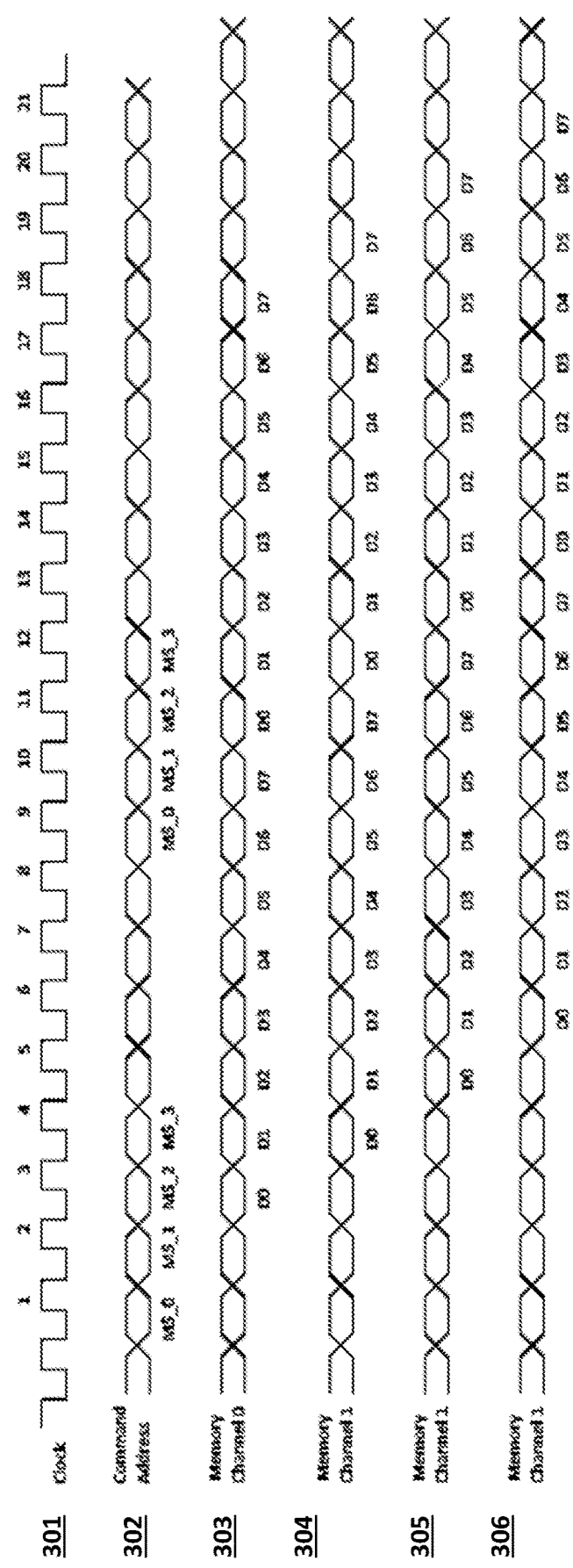
FIG. 3 depicts an exemplary timing diagram for a bus between a processor chip and cache memory chip utilized in the improved cache memory and system memory architecture.

For the case of memory burst length is 8, the fastest consecutive command and address will be no earlier than the 8th clock. FIG. 3 shows timing sequence of the interface bus between processor and cache RAM chip with a pipeline latency for the memory array is 2-1-1-1-1-1-1-1.

The first command/address is asserted by memory master 0 at 1st clock. The memory array returns 8 consecutive data starting at 2nd clock and ending at 9th clock. As shown in the FIG. 3, the fastest next consecutive command address by the memory master 0 is at 9th clock after issuing the command address at 1st clock. That is to say, between 1st clock and 9th clock, the command/address bus is idle to memory master 0 and is available for other memory masters to issue the command address to the same bus. Thus, other memory masters can perform "cycle stealing" from the idle command address bus. Through this type of cycle stealing

TABLE 1

| Processor bus | System memory master | Last level Cache RAM | System memory |
|---|---|---|---|
| Cache read hit | idle | LLC RAM to processor cache bus | idle |
| Cache read hit | snooping miss | LLC RAM to processor cache bus | System memory to system bus |
| Cache flush hit | idle | Write to LLC RAM | idle |
| Cache flush hit | Snooping miss | Write to LLC RAM | System memory to system bus |
| Cache read miss | idle | Update LLC RAM | Read to LLC RAM, Flush if replace dirty line |
| Cache flush miss | idle | idle | Write to system memory |
| idle | Snooping read hit, (inclusion miss, LLC clean) | LLC RAM to system bus | idle |
| idle | Snooping read hit, (inclusion miss, LLC dirty) | LLC RAM to system bus | Updated by LLC RAM |
| Idle | Snooping read hit (inclusion hit, clean) | Upper cache to system memory bus | idle |
| idle | Snooping read hit (inclusion hit, dirty) | Snooping read hit (inclusion hit, clean) | Updated by upper cache |
| Idle | Snooping write hit (inclusion miss, clean) | Write to LLC RAM | idle |
| idle | Snooping write hit (inclusion miss, dirty) | Write to LLC RAM | idle |
| Idle | Snooping write hit (inclusion hit, clean) | Upper cache invalidate, Write to LLC RAM | idle |
| idle | Snooping write hit (inclusion hit, dirty) | Flush from upper cache, Read-modify-write | Flush from upper cache, read to LLC RAM | on a single command address bus, one can support multiple memory channels on a single command address bus without multiple dedicated command address bus to each memory channel. FIG. 3 shows the memory burst length of 8 can support up to 8 concurrent memory channel command address cycles on a single command address bus.

Because the memory array architecture consists of a row and column decoder, further reduction of the command and address bus protocol can be achieved without performance degradation. A cache memory chip 120 typically consists of SRAM where one can decode a column address later than the row address without slowing down the memory access. Therefore, an SRAM command address bus protocol can strobe the row address at a rising clock edge and strobe the column address at a falling edge. In this way, one can reduce the number of address signals by half.

The command address bus protocol to cache RAM chip 120 consists of two sets of command address protocol, namely, one to cache RAM and the other to legacy system memory. Data router 127 must re-route the data between the cache RAM 126a . . . 126j and system memory 130 as described in Table 1, whenever there is a cache miss or a snoop hit. Thus, in the command to cache RAM chip, one must include the instruction to the data router 127 as to how to re-route the memory data.

The four separated cache RAM command address bus shown in the FIG. 2 can be implemented by a single command address bus based on fixed burst length cycle stealing technique described above. That is, a single command address bus performs as a pseudo multiple port of memory command address bus. The four legacy system memory command can also reduce to a single command address bus like a cache RAM command address bus.

Figure 4A:
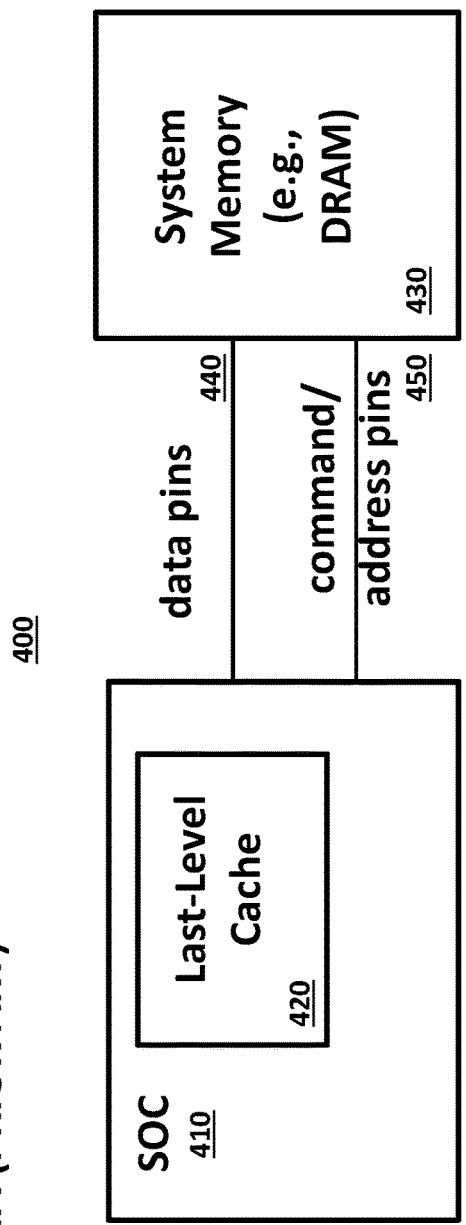
FIG. 4A depicts a prior art memory system.
Figure 4B:
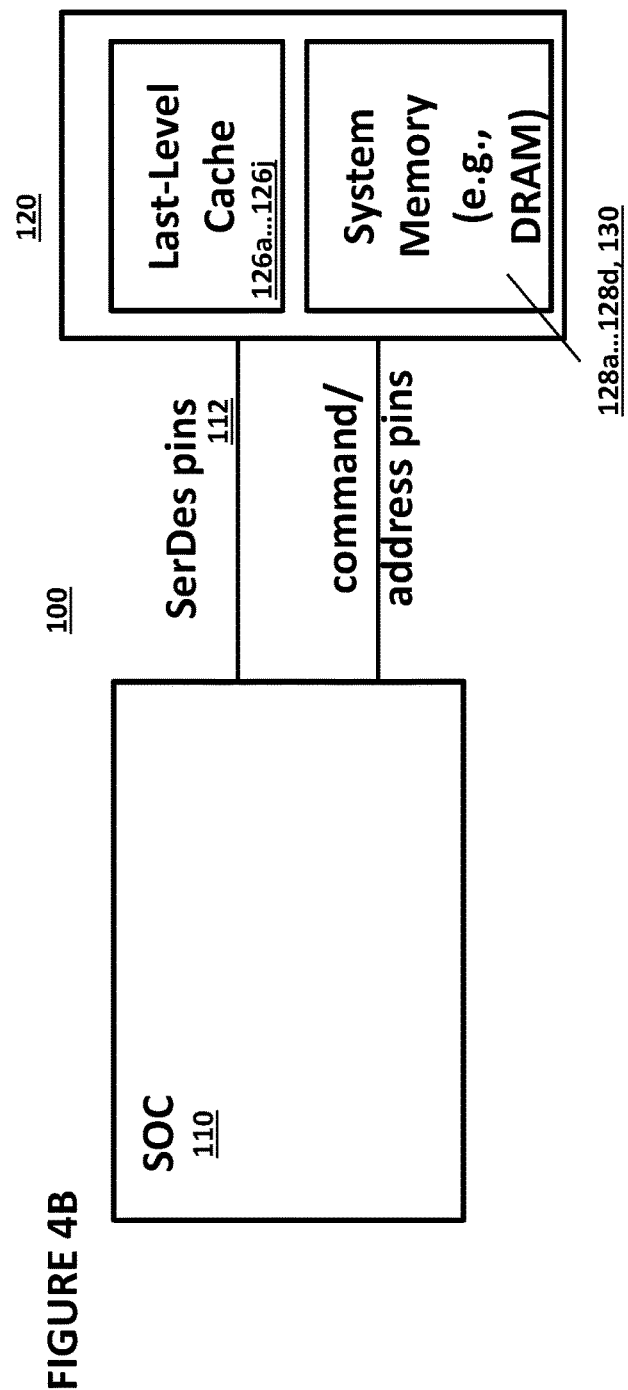
FIG. 4B depicts a block diagram of an embodiment utilizing the improved cache memory and system memory architecture.
Figure 5:
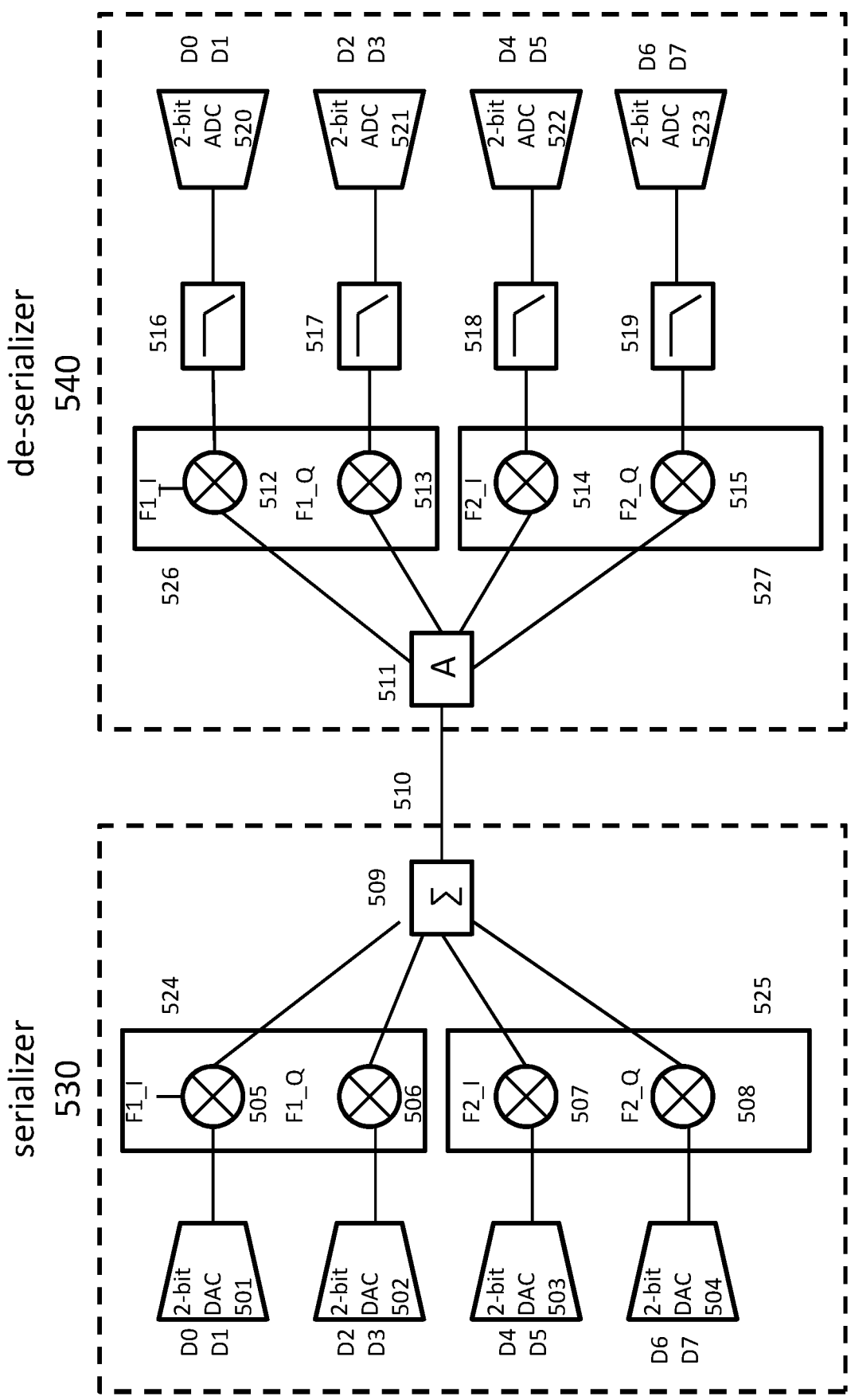
FIG. 5 depicts a prior art serializer and deserializer.
Figure 6:
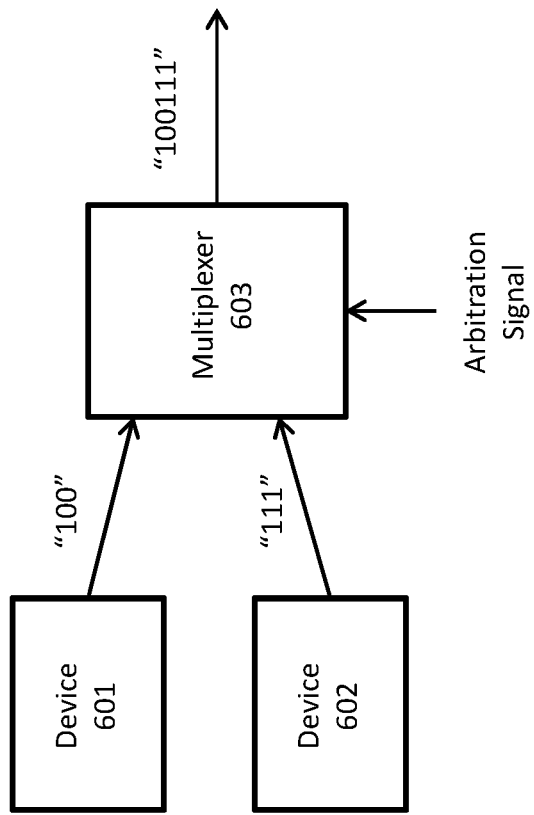
FIG. 6 depicts a prior art pseudo-multiple port device.

High-level differences between the design of the prior art and these embodiments is shown in FIGS. 4A and 4B.

In FIG. 4A, a prior art system 400 is shown, where a processor SOC 410 contains a last-level cache 420, and the SOC 410 interfaces to system memory 430 (e.g., a DRAM chip) over numerous data pins 440 and command/address pins 450. Increasing the size of the last-level cache 420 would improve the cache hit rate. However, the SOC semiconductor process is relatively expensive, so using a larger last-level cache 420 on the SOC 410 would be expensive.

In FIG. 4B, computing device 100 is shown, where processor SOC 110 interfaces to a cache-system memory 120 over a SerDes interface 112 and a command/address interface 410. The cache-system memory module 120 comprises last-level cache memory 126a . . . 126j as well as system memory 128a . . . 128d and 130. Because the last-level cache is on a separate chip from the SOC, the last-level cache can be made larger than in FIG. 4A because the cache-system memory module can be manufactured with a cheaper semiconductor process. Typically, an SOC is manufactured with around 11 metal layers, whereas a memory chip can be manufactured with around 6 metal layers.

Another benefit of the embodiment shown in FIG. 4B is that no pins are required between the SOC and system memory. Those pins typically require substantial power and also require termination circuitry.

In summary, we describe an invention for multiple channel concurrent cache RAM and system memory based on a short latency SerDes and a pseudo multiple port command address bus. The invention not only reduces the number of interface pin between processor and memory system for multiple memory channel for cost competitive manufacturing but also maintains high memory performance of short latency and high concurrency.

What is claimed is:

1. A computing device comprising:
    a first chip comprising one or more CPU cores, a memory controller coupled to the one or more CPU cores, a first serializer-deserializer device, the memory controller comprising a cache memory controller and a system memory controller;
    a second chip comprising cache memory managed by the cache memory controller, a data router, and a second serializer-deserializer device;
    system memory separate from the first chip and the second chip and managed by the system memory controller and the data router;
    a first interface coupled between the system memory and the second chip;
    a second interface comprising a single wire coupled between the first serializer-deserializer device and the second serializer-deserializer device, wherein the first serializer-deserializer device and the second serializer-deserializer device exchange data over the single wire using quadrature amplitude modulation;
    wherein a memory request from the one or more CPU cores is serviced by the cache memory controller by providing data from the cache memory to the one or more CPU cores over the second interface if there is a cache hit for the memory request or by the data router by providing data to the one or more CPU cores from the system memory if there is a cache miss for the memory request.

2. The computing device of claim 1, wherein the memory controller is coupled to the one or more CPU cores with a processor bus.

3. The computing device of claim 2, further comprising a system bus coupled to the memory controller.

4. The computing device of claim 3, wherein the system bus is coupled to one or more graphics processor unit (GPU) cores.

5. The computing device of claim 4, wherein the memory controller comprises an arbiter for managing control of the system bus.

6. A computing device comprising:
    a first chip comprising one or more CPU cores, a memory controller coupled to the one or more CPU cores, and a first serializer-deserializer device, the memory controller comprising a cache memory controller and a system memory controller;
    a second chip comprising cache memory managed by the cache memory controller, a data router, and a second serializer-deserializer device;
    system memory separate from the first chip and the second chip, managed by the system memory controller and the data router, and coupled to the second chip by a first interface;
    a second interface comprising a single wire between the first chip and the second chip, wherein the first serializer-deserializer device and the second serializer-deserializer device exchange a plurality of data bits over the single wire using a quadrature amplitude modulation analog signal; and
    a bus between the first chip and the second chip, wherein the memory controller and the data router transfer command and address information;
    wherein in response to a memory request from the one or more CPU cores received by the data router over the bus, data is provided over the second interface to the one or more CPU cores from the cache memory if there is a cache hit for the memory request or from the system memory if there is a cache miss for the memory request.

7. The computing device of claim 6, wherein the memory controller is coupled to the one or more CPU cores with a processor bus.

8. The computing device of claim 7, further comprising a system bus coupled to the memory controller.

9. The computing device of claim 8, wherein the system bus is coupled to one or more graphics processor unit (GPU) cores.

10. The computing device of claim 9, wherein the memory controller comprises an arbiter for managing control of the system bus.

11. A method for reading data in a computing device, the computing device comprising a first chip, a second chip, and system memory, the first chip comprising one or more CPU cores, a memory controller coupled to the one or more CPU cores, and a first serializer-deserializer device, the memory controller comprising a system memory controller and a cache memory controller, and the second chip comprising cache memory managed by the cache memory controller and a second serializer-deserializer device, the method comprising:
receiving, by the memory controller, a read request from the one or more CPU cores for data associated with an address;
obtaining the data associated with the address from the cache memory if there is a cache hit for the address and from the system memory if there is a cache miss for the address;
modulating, using the second serializer-deserializer device, the data associated with the address using quadrature amplitude modulation to generate an analog signal;
transmitting the analog signal from the second serializer-deserializer device to the first serializer-deserializer device over a single wire;
demodulating the data, using the first serializer-deserializer device, to generate the data associated with the address; and
sending the data associated with the address to the one or more CPU cores in response to the read request.

12. The method of claim 11, wherein the modulating step comprises:
converting the data associated with an address into an intermediate analog signal;
modulating the intermediate analog signal using a plurality of quadrature amplitude modulators; and
summing the output of the plurality of quadrature amplitude modulators to generate the analog signal.

13. The method of claim 12, wherein the demodulating step comprises:
applying a gain to the analog signal to generate an amplified analog signal;
demodulating the amplified analog signal using a plurality of quadrature amplitude modulators;
filtering the demodulated signal using low-pass filters; and
converting the filtered data into the data associated with an address.

14. A method for reading data in a computing device, the computing device comprising a first chip, a second chip, and system memory coupled to the second chip by an interface, the first chip comprising one or more CPU cores, a memory controller coupled to the one or more CPU cores, and a first serializer-deserializer device, and the second chip comprising cache memory managed by the memory controller and a second serializer-deserializer device, the memory controller comprising a system memory controller and a cache memory controller, the method comprising:
receiving, by the memory controller, a read request from the one or more CPU cores for data associated with an address;
receiving, by the second chip, a command and address from the first chip over a bus for commands and addresses;
obtaining the data associated with an address from the cache memory if there is a cache hit for the address and from the system memory if there is a cache miss for the address;
modulating, using the second serializer-deserializer device, the data associated with an address using quadrature amplitude modulation to generate an analog signal;
transmitting the analog signal from the second chip to the first chip over a single wire;
demodulating the data, using the first serializer-deserializer device, to generate the data associated with an address; and
sending the data associated with an address to the one or more CPU cores in response to the read request.

15. The method of claim 14, wherein the modulating step comprises:
converting the data associated with an address into an intermediate analog signal;
modulating the intermediate analog signal using a plurality of quadrature amplitude modulators; and
summing the output of the plurality of quadrature amplitude modulators to generate the analog signal.

16. The method of claim 15, wherein the demodulating step comprises:
applying a gain to the analog signal to generate an amplified analog signal;
demodulating the amplified analog signal using a plurality of quadrature amplitude modulators;
filtering the demodulated signal using low-pass filters; and
converting the filtered data into the data associated with an address.

* * * * *